(12) United States Patent
Shin (10) Patent No.: US 11,207,997 B2
(45) Date of Patent: Dec. 28, 2021

(54) CHARGING ROBOT AND DEVICE FOR CONTROLLING SAME

(71) Applicant: LG ELECTRONICS INC., Seoul (KR)

(72) Inventor: Chang Eui Shin, Seongnam-si (KR)

(73) Assignee: LG ELECTRONICS INC., Seoul (KR)

( * ) Notice: Subject to any disclaimer, the term of this patent is extended or adjusted under 35 U.S.C. 154(b) by 281 days.

(21) Appl. No.: 16/571,829

(22) Filed: Sep. 16, 2019

(65) Prior Publication Data
US 2020/0009978 A1    Jan. 9, 2020

(30) Foreign Application Priority Data

May 7, 2019 (KR) ................. PCT/KR2019/005412

(51) Int. Cl.
*B60L 53/37* (2019.01)
*H02J 7/00* (2006.01)
*B60L 53/66* (2019.01)
*B60L 53/14* (2019.01)

(52) U.S. Cl.
CPC .............. *B60L 53/37* (2019.02); *B60L 53/14* (2019.02); *B60L 53/66* (2019.02); *H02J 7/0045* (2013.01); *B60Y 2200/91* (2013.01); *B60Y 2300/91* (2013.01)

(58) Field of Classification Search
CPC .......... B60L 53/37; B60L 53/14; B60L 53/66; H02J 7/0045; B60Y 2200/91; B60Y 2300/91

USPC ......................................................... 320/109
See application file for complete search history.

(56) References Cited

U.S. PATENT DOCUMENTS

| 8,473,131 B2 * | 6/2013 | Leary ...................... B60L 53/35 701/22 |
| 8,975,864 B2 * | 3/2015 | Kim ......................... B60L 53/11 320/109 |
| 9,581,997 B1 * | 2/2017 | Penilla .................... B60L 53/80 |
| 9,592,742 B1 | 3/2017 | Sosinov et al. |
| 10,236,698 B2 * | 3/2019 | Chen ...................... H02J 7/345 |
| 10,647,216 B2 * | 5/2020 | Seo .......................... B60L 53/36 |
| 10,800,279 B2 * | 10/2020 | Bhat ....................... H02J 7/0013 |

(Continued)

FOREIGN PATENT DOCUMENTS

| JP | 2012-100417 A | 5/2012 |
| KR | 10-1998-0009735 A | 4/1998 |

(Continued)

*Primary Examiner* — Suresh Memula
(74) *Attorney, Agent, or Firm* — Birch, Stewart, Kolasch & Birch, LLP (57) ABSTRACT

Disclosed is a device for controlling one or more charging robots in a charging station including a plurality of charging sectors. The device includes a communication unit for communicating with the charging robot, an inputter for inputting an image signal, and a controller, wherein the controller may recognize the electric vehicle entering the charging sector based on information inputted through the inputter, select a charging robot that is located at a close distance from the charging sector and is directly movable to the charging sector, and cause the selected charging robot to move to the charging sector. Accordingly, a charging robot and a control device having artificial intelligence and performing 5G communication can be provided.

15 Claims, 7 Drawing Sheets

(56) References Cited

U.S. PATENT DOCUMENTS

| | | | | |
|---|---|---|---|---|
| 2011/0254504 | A1* | 10/2011 | Haddad | B60L 53/65 |
| | | | | 320/109 |
| 2013/0076902 | A1* | 3/2013 | Gao | H01R 13/6683 |
| | | | | 348/148 |
| 2014/0002018 | A1* | 1/2014 | Cavazos | B60L 50/52 |
| | | | | 320/109 |
| 2016/0352113 | A1* | 12/2016 | Zhao | B60L 53/35 |
| 2017/0320399 | A1* | 11/2017 | Yuan | B60L 55/00 |
| 2018/0201138 | A1* | 7/2018 | Yellambalase | B60L 58/12 |
| 2018/0345811 | A1* | 12/2018 | Michels | G07C 5/0808 |
| 2019/0285425 | A1* | 9/2019 | Ludwick | B60L 53/66 |
| 2019/0340782 | A1* | 11/2019 | Sinha | G06K 9/6202 |
| 2020/0009977 | A1* | 1/2020 | Park | B60L 53/37 |
| 2020/0031248 | A1* | 1/2020 | Kwak | H02J 7/0042 |
| 2020/0144838 | A1* | 5/2020 | Penilla | B60L 53/665 |
| 2020/0361331 | A1* | 11/2020 | Shin | B60L 53/37 |

FOREIGN PATENT DOCUMENTS

| | | |
|---|---|---|
| KR | 10-1100363 B1 | 12/2011 |
| KR | 10-2012-0102461 A | 9/2012 |
| KR | 10-1410272 B1 | 6/2014 |
| KR | 10-2018-0041869 A | 4/2018 |
| KR | 10-2019-0008729 A | 1/2019 |

* cited by examiner

CHARGING ROBOT AND DEVICE FOR CONTROLLING SAME

CROSS-REFERENCE TO RELATED APPLICATION

This present application claims benefit of priority to PCT Patent Application No. PCT/KR2019/005412, entitled "Charging robot and device for controlling same," filed on May 7, 2019, in the World Intellectual Property Organization, the entire disclosure of which is incorporated herein by reference.

BACKGROUND

1. Field of the Invention

The present disclosure relates to a charging robot and a device for controlling the same and, more particularly, to a charging robot for charging an electric vehicle battery in a charging station and a device for controlling one or more charging robots.

2. Description of Related Art

An electric vehicle (EV) is a new concept car that is not powered by gasoline, diesel fuel, and the like, but is powered using electricity as energy to drive an electric motor.

Korean Patent Registration No. 101100363B, entitled "System and Method for Electric Charging of a Hybrid Car in Parking Area" discloses a charging robot for an EV including a driving unit, a recognition unit, an authentication unit, a power supply unit, and the like, which is capable of inspecting and charging an EV battery while the EV is parked in a parking lot.

However, the above-mentioned charging robot is not capable of determining whether or not an EV occupant disembarks the EV, and is only capable of moving along a predetermined movement path.

Japanese Patent Application Publication No. 2012100417A, entitled "Charger for Electric Vehicle" discloses a charging device for an EV which is capable of detecting when a suspicious person approaches and is capable of sounding an alarm to prevent theft or accident.

However, since the above-mentioned charging device is installed in a fixed manner and thus incapable of being moved, the charging device is not capable of approaching the EV for charging.

SUMMARY OF THE INVENTION

The present disclosure is directed to providing a robot for charging an EV battery while considering the safety of an EV occupant.

The present disclosure is further directed to providing a robot that is capable of advance movement to perform charging while an EV is being parked in a charging location, and a device for controlling the same.

The present disclosure is still further directed to providing a charging robot for efficiently performing charging, and a control device for controlling one or more charging robots, even when the number of charging robots is fewer than that of locations where the charging is performed.

The present disclosure is not limited to what has been mentioned above. A person skilled in the art may clearly understand, from the following description, other aspects not mentioned.

A charging robot according to an embodiment of the present invention may charge an EV battery in a charging sector divided into a first space, in which a charging gun is located and in which the EV battery is charged, and a second space, adjacent to the first space, in which a charging manipulation unit is located.

To this end, the charging robot may include a moving module; a robot arm for handling the charging gun; one or more sensing units; an input unit for inputting an image signal; and a control module for recognizing a charging port of an electric vehicle based on information detected by the sensing unit or information inputted through the input unit, and controlling the robot arm such that the charging gun is coupled to the charging port.

In addition, the control module may cause the moving module to enter the first space of the particular charging sector when the EV is parked in the first space of the particular charging sector and an EV occupant leaves the first space of the particular charging sector and enters the second space. Accordingly, the safety of the EV occupant can be assured, and charging efficiency can be improved.

Further, the control module may cause the moving module to move at a first speed toward the first space of the particular charging sector while the EV is being parked in the first space of the particular charging sector.

Furthermore, the control module may cause the moving module to approach the first space of the particular charging sector at a second speed faster than the first speed when the EV occupant has moved from the first space to the second space of the particular charging sector.

Furthermore, the control module may cause the robot arm to decouple the charging gun from the charging port when charging of the EV battery is completed and the EV occupant is not located in the first space of the particular charging sector.

The technical solution of the present disclosure is not limited to those mentioned above. A person skilled in the art may clearly understand from the following description, other technical solutions not mentioned.

According to various embodiments of the present disclosure, the following effects are able to be obtained.

First, it is possible to charge an EV battery while ensuring the safety of an EV occupant.

Second, charging is performed using a charging robot that is disposed closest to a charging place of the EV and available for charging, thereby improving charging efficiency.

Thirdly, since the EV occupant and the charging robot are not disposed in the same area at the same time, safety of the EV occupant can be assured and a charging operation can be performed quickly.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
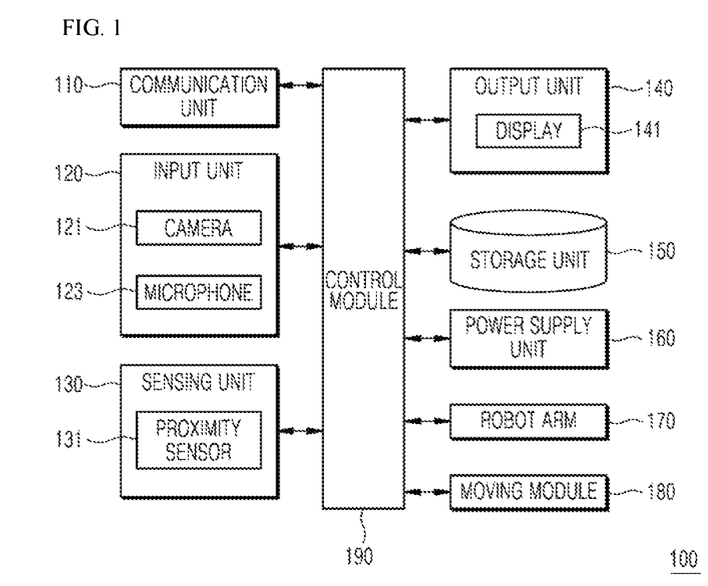
FIG. 1 is a block diagram illustrating a configuration of a charging robot that is located in a charging station and that charges an EV battery according to one embodiment of the present disclosure.

FIG. 1 is a block diagram illustrating a configuration of a charging robot 100 for charging a battery of an electric vehicle (EV) in a charging station according to one embodiment of the present disclosure. The charging station is a place in which when the EV enters for charging, one or more charging robots are deployed to safely charge the battery of the entering EV.

Referring to FIG. 1, the charging robot 100 may include a communication unit 110, an input unit 120, a sensing unit 130, an output unit 140, a storage unit 150, a power supply unit 160, a robot arm 170, a moving module 180, and a control module 190. The components shown in FIG. 1 are not essential for implementing the charging robot 100, and thus the charging robot 100 described in this specification, may have fewer or more components than those listed above.

More specifically, the communication unit 110 of the above components may include one or more wired or wireless communication modules that allow for communications between the charging robot 100 and a control device 200 (in FIG. 2 to be described later), between the charging robot 100 and a mobile terminal, between the charging robot 100 and a device having a communication module, and the like. The communication unit 110 may include a mobile communication module, a local area communication module, and the like. The communication unit 110 comprises at least one of a communicator.

The input unit 120 may include: a camera 121 or image input unit from which the input unit 120 receives an image signal; a microphone 123 or audio input unit from which the input unit 120 receives an audio signal; a user input unit such as a touch key and a mechanical key for receiving information from a user; and the like. Audio data or image data collected by the input unit 120 may be analyzed and processed as a user's control instructions. In some implementations, the input unit 120 may be implemented inputter or input interface. In some implementations, the input unit 120 comprises at least one of inputter or consists of at least one of inputter. In some implementations, the input unit 120 may be configured to input data and signals.

The control module 190 may recognize a person based on an image photographed through the camera 121, and particularly, may recognize an EV occupant located in the charging station and movement of the EV occupant.

The sensing unit 130 may include one or more sensors for detecting at least one of: information related to the charging robot 100 itself, surrounding environment information around the charging robot 100, and user information. For example, the sensing unit 130 may include at least one of: a proximity sensor 131; a weight sensing sensor; an illumination sensor; a touch sensor; an acceleration sensor; a magnetic sensor; a G-sensor; a gyroscope sensor; a motion sensor; an RGB sensor; an infrared sensor (IR sensor); a finger scan sensor; an ultrasonic sensor; an optical sensor (see, for example, camera 121); a microphone (see microphone 123); a weight sensing sensor; a battery gauge; an environment sensor such as a barometer, a hygrometer, a thermometer, a radiation sensing sensor, a heat sensing sensor, and a gas sensing sensor; and a chemical sensor such as an electronic nose, a healthcare sensor, and a biometric sensor. Meanwhile, the charging robot 100 disclosed in this specification may combine and utilize information detected by at least two of the above-mentioned sensors. The sensing unit 130 comprises at least one of a sensor.

The output unit 140 is for generating a visual output, an audio output, a tactile output, and the like, and may include at least one of: a display 141 (a plurality of displays being applicable), one or more light emitting devices, a voice output unit, and a haptic module. The display 141 may be formed to be layered with the touch sensor or may be formed to be integrated with the touch sensor, so that the display 141 may be implemented as a touch screen. The touch screen may function as a user input unit for providing an input interface between the charging robot 100 and a user, and at the same time, may provide an output interface between the charging robot 100 and the user.

The storage unit 150 stores data which enables the charging robot 100 to perform various functions. The storage unit 150 may store a number of application programs (or applications) running on the charging robot 100, data for operation of the charging robot 100, instructions, and the like. At least some of these application programs may be downloaded from an external server through wireless communication. In addition, the storage unit 150 may store user information for interaction with the charging robot 100. The user information may be used to identify who a recognized user is.

Under the control of the control module 190, the power supply unit 160 is powered internally and/or externally, and supplies power to each component of the charging robot 100. The power supply unit 160 includes a battery, which may be a built-in battery or a replaceable battery. The battery may be charged by a wired or wireless charging scheme, wherein the wireless charging scheme may include a magnetic induction scheme or a magnetic resonance scheme.

When the battery level of the power supply unit 160 is insufficient to carry out a moving operation, the control module 190 may cause the charging robot 100 to move to a predetermined charging station in order to charge the battery. That is, the charging robot 100 may charge the EV battery, and may move to the predetermined charging station when the battery of the charging robot 100 needs to be charged. Accordingly, abrupt stoppage or malfunction of the charging robot 100 can be prevented.

The charging robot 100 may include at least one robot arm 170 capable of grasping a charging gun. Under the control of the control module 190, the robot arm 170 may decouple the charging gun from a holder of the charging gun and couple the charging gun to a charging port of the EV. When charging is completed, the robot arm 170 may decouple the charging gun from the charging port of the EV and then mount the charging gun into the holder of the charging gun. Here, a manner in which the charging gun is coupled to and decoupled from the charging port of the EV may vary.

The moving module 180 is a module for moving to a predetermined location under the control of the control module 190, and may include one or more wheels. The moving module 180 comprises at least one of a mover or consists of at least one of a mover. The mover which is configured to move to a predetermined location under the control of the control module 190

The control module 190 may recognize the charging port of the EV based on information detected by the sensing unit 130 or information inputted through the camera 121, and may cause the robot arm 170 to couple the charging gun to the charging port. In some implementations, the control module 190 may be implemented a controller. In some implementations, the control module 190 comprises at least one of a controller or consists of at least one of a controller.

Figure 2:
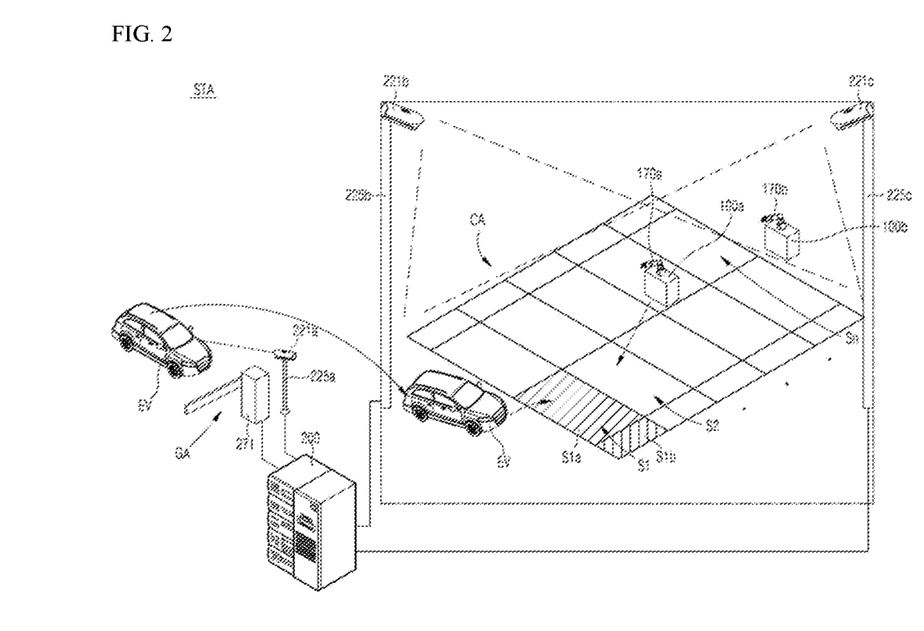
FIG. 2 is a view illustrating a process in which the charging robot charges the EV battery in the charging station according to one embodiment of the present disclosure.

Hereinafter, a process in which the charging robot 100 charges the EV battery in the charging station STA according to one embodiment of the present disclosure will be described with reference to FIG. 2.

The charging station STA may be located next to a road and is a place in which the EV battery is charged. The charging station STA may include a gate GA and may include a charging area CA.

The gate GA is a place in which the EV enters and exits, and may include an entry and exit gate 271 and a first camera 221*a*. The entry and exit gate 271 may perform, under the control of the control device 200, an open/close operation so that the EV is able to enter and exit. The control device 200 may recognize a vehicle model of the EV, a vehicle name of the EV, the position of the charging port of the EV, and the like, from an image photographed through the first camera 221*a*. The first camera 221*a* may be fixed to a pole 225*a*.

The control device 200 may allow entry of all vehicles, but in one embodiment, the control device 200 may control the entry and exit gate 271 in order to only allow entry of registered vehicles without allowing entry of vehicles that use gasoline, diesel fuel, and the like, as a power source.

In addition, the control device 200 may present a discount of a charging fee or issue various coupons to predetermined members, and the coupons may be provided in the form of a push notification to the mobile terminal of the EV occupant, but the embodiment is not limited thereto.

The control device 200 may include a second camera 221*b* and a third camera 221*c*. The second camera 221*b* and the third camera 221*c* are cameras that monitor in real time an entire area (EV charging area CA) in which the EV is being charged, and the control device 200 may perform appropriate measures based on information collected through the second camera 221*b* and the third camera 221*c*. In addition, the second camera 221*b* and the third camera 221*c* may be fixed to poles 225*b* and 225*c*. Depending on an implementation, the number of cameras may be fewer or greater.

One or more charging robots 100*a* and 100*b* are located in the charging area CA of the EV, and the charging area CA may include charging sectors S1 to Sn in which a plurality of EVs may be charged simultaneously. The charging robots 100*a* and 100*b* may move to an EV that requires charging based on the distance to the parked EV, based on whether the charging should be performed, and the like.

In such a case, the control device 200 may determine which of the charging robots will charge an EV that has entered the particular charging sector S1. For example, the control device 200 may cause the first charging robot 100*a*, which is closest to the particular charging sector S1 and not in use, to move to the particular charging sector S1.

The charging area CA includes the plurality of charging sectors S1 to Sn, and each of the plurality of charging sectors (S1 being described as an example) may include a first space S1*a* in which the charging gun is located, and the charging robot 100*a* may approach under a predetermined condition and the charging of the EV battery is performed, and a second space S1*b*, immediately adjacent to the first space S1*a*, which restricts an approach of the charging robot 100*a* and in which a charging manipulation unit is located. The structure of one sector will be described in more detail with reference to FIGS. 3 to 5.

Figure 3:
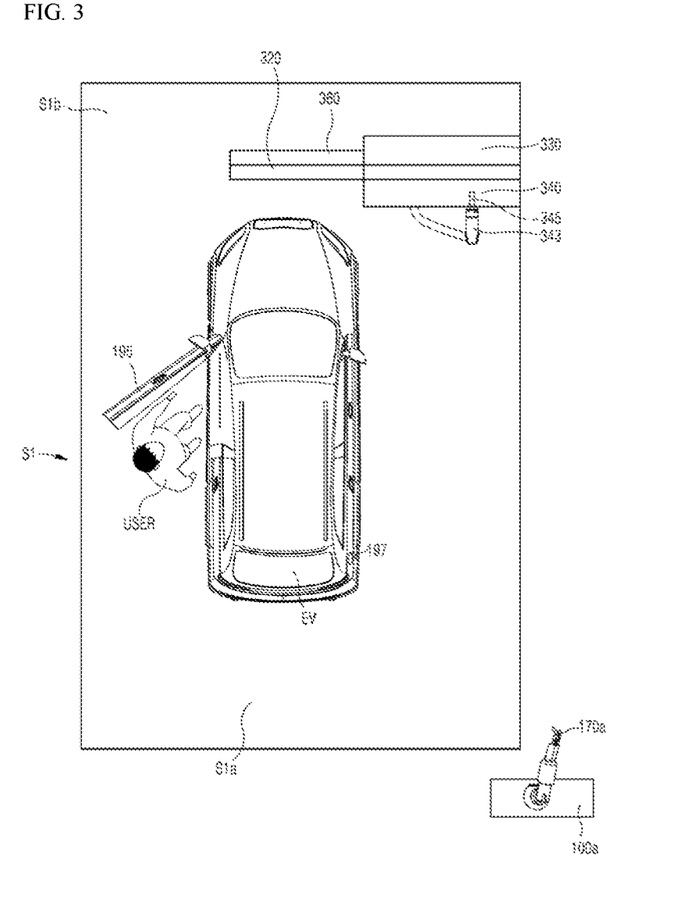
FIGS. 3 to 5 are views illustrating a process in which the charging robot charges the EV battery in a charging sector.
Figure 4:
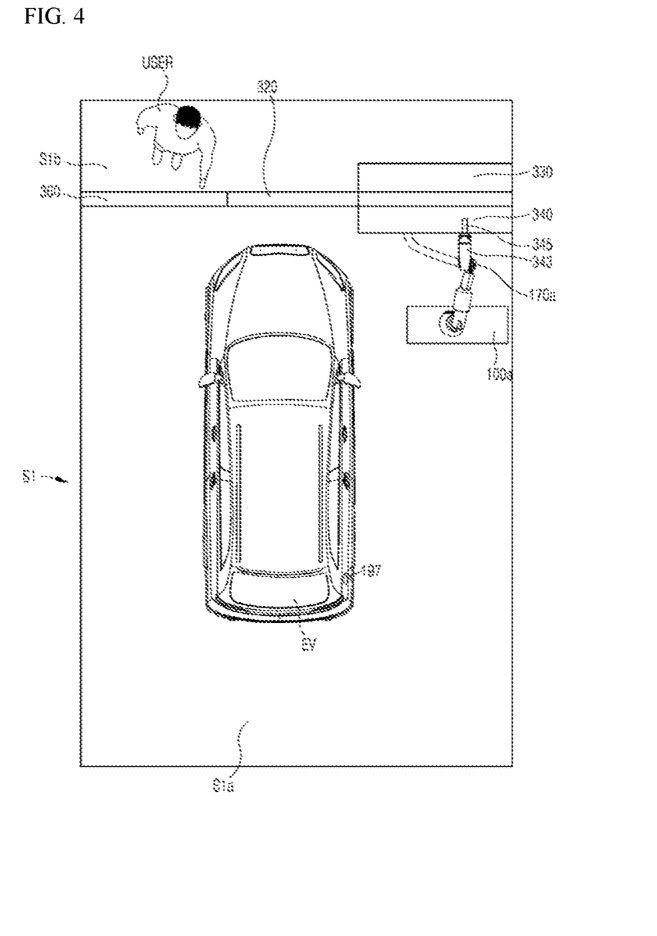
Figure 5:
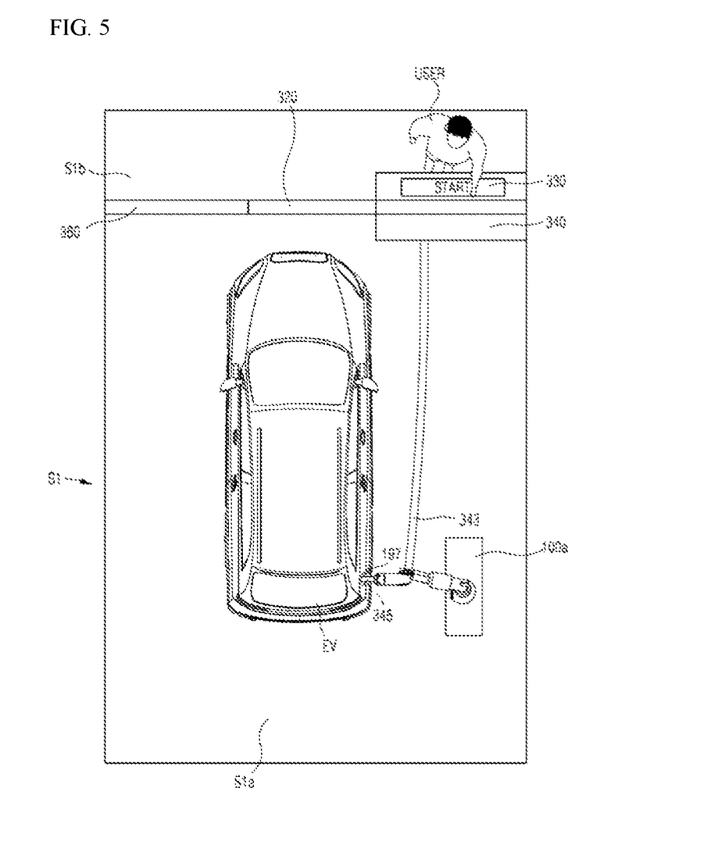

FIGS. 3 to 5 are views illustrating a process in which the particular charging robot 100*a* charges the EV battery in the particular charging sector S1. In the description of FIGS. 3 to 5, reference will also be made to the reference numerals of FIG. 2 and the illustration of the charging sectors S2 to Sn, other than the particular charging sector S1, will be omitted. The charging sector may be represented by a charging section.

The charging sector S1 may include a first space S1*a* and a second space S1*b*. A charging source 340 and a charging gun 343, which includes an adapter 345 connectable to the charging port of the EV, are located in the first space S1*a*. The charging gun 343 may be mounted in the holder of the charging gun. The first space S1*a* is a space in which the EV is parked and in which the EV occupant USER disembarks the EV for charging.

The second space S1*b* is a space in which the charging manipulation unit 330 is located. The charging manipulation unit 330 corresponds to a module that performs charging of the EV battery when the charging gun 343 is coupled to the charging port of the EV and a user input such as a "START" button input of the EV occupant USER is received. In an embodiment, the button input may be replaced by various user inputs, and a person performing the button input may be an employee of the charging station other than the EV occupant.

The charging manipulation unit 330 and the charging source 340 may perform wireless or wired communication with each other, and the charging manipulation unit 330 and the charging source 340 may be a device formed to be integrated with each other. In this case, since the integrated device becomes a blocking wall, the blocking wall may not be formed in a space in which the integrated device is disposed. The charging manipulation unit 330 comprises at least one of a charging manipulator or consists of at least one of a charging manipulator. The charging manipulatior which is configured to transmit a charging operation command to the charging robot 100 using a communication module thereof.

The charging manipulation unit 330 may transmit a charging operation command to the charging robot 100 using a communication module thereof. The charging robot 100 may enter the first space S1a to perform the charging based on the charging operation command.

The first space S1a and the second space S1b may be separated from each other by the blocking wall 320, and a door 360 is disposed in a partial space or an entire space of the blocking wall 320 so that the EV occupant may move from the first space S1a to the second space S1b. The door 360 may be an automatic door or a manual door, and may be formed as a screen door.

In an embodiment, the door 360 may further include a sensing unit for detecting the EV occupant moving from the first space S1a to the second space S1b, and a communication module for communicating with the charging robot 100. In this case, when the EV occupant moving from the first space S1a to the second space S1b is detected through the sensing unit, the door 360 may inform, through the communication module, the charging robot 100 of such sensing.

The door 360 may be automatically opened when the EV occupant USER moves from the first space S1a to the second space S1b, and may be required to follow a special authorization procedure when the EV occupant USER moves from the second space S1b to the first space S1a. For example, the door 360 may only be opened when the charging robot 100a completes a charging and leaves the charging sector S1.

The door 360 may be automatically opened when the EV occupant USER disembarks the EV, and according to an embodiment, the door 360 may be automatically opened when the EV occupant USER approaches the door 360.

The blocking wall 320 may be disposed to penetrate between the charging source 340 and the charging manipulation unit 330, and according to an implementation, the charging source 340 may be a part of the blocking wall 320.

The charging robot 100a may move, without aid or instruction, to the charging sector S1 or may move to the charging sector S1 according to the control of the control device 200.

First, describing a case that the charging robot 100a moves, without aid or instruction, to the charging sector S1, the charging robot 100a may recognize, through the camera 121, the EV approaching the charging sector S1, and move to the charging sector S1.

In such a case, when the EV is moving to the charging sector S1, the charging robot 100a may move to the charging sector S1, in advance, at a low speed (first speed), thereby improving charging efficiency.

If the EV occupant USER is determined to have moved to the second space S1b (FIG. 4), the charging robot 100a may approach the charging sector S1 at a faster speed (second speed). The first speed and the second speed may be set differently depending on a size of the charging station STA, an implementation situation of the charging robot 100a, and the like.

That is, the charging robot 100a may enter the first space S1a and then perform the charging only when the EV occupant leaves the first space S1a where the charging of the EV battery is performed. Accordingly, the safety of the EV occupant can be assured.

The charging robot 100a may recognize that the EV occupant has moved from the first space S1a to the second space S1b based on the image photographed through the camera, and may then move to the first space S1a.

However, according to an embodiment, when the EV occupant USER continues to be located inside the EV, the EV occupant USER may be deemed to have moved to a safe space, in which case, to prevent the EV occupant USER from leaving the EV during charging, the EV doors are all locked and may not be opened by the EV occupant USER.

In addition, when the charging robot 100a enters the first space S1a, the charging robot 100a may transmit a door locking command to the EV through the communication unit 110 to lock the EV doors.

Referring to FIG. 4, the charging robot 100a may approach the first space S1a at a faster speed than that in FIG. 3 when the EV occupant USER has moved to the second space S1b. Referring to FIG. 5, the charging robot 100a may grasp the charging gun 343 from the holder thereof and couple the charging gun to the charging port of the EV. A charging may be performed when a charging start command ("START" button input) is inputted by the EV occupant USER.

In another embodiment, the charging robot 100a may move to the charging sector S1 under the control of the control device 200. The control device 200 may select an available charging robot 100a that is closest to the charging sector S1.

The control device 200 may cause the selected charging robot 100a to move to the first space S1a of the charging sector S1.

In addition, the control device 200 may provide the charging robot 100a with position information on the charging port of the EV, position information on the EV occupant, and the like. To this end, the control device 200 may have a plurality of cameras (221a to 221c in FIG. 2).

Further, the control device 200 may cause the charging robot 100a to move to the first space S1a after the EV occupant USER has moved to the second space S1b, as described with reference to FIGS. 3 to 5.

Figure 6:
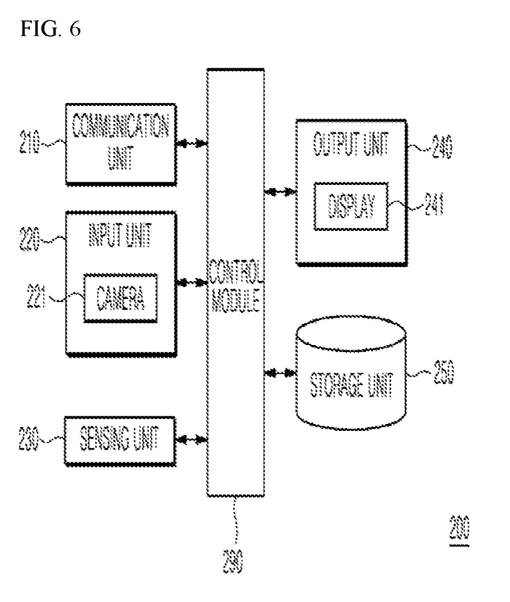
FIG. 6 is a block diagram illustrating a configuration of a device for controlling the charging robot according to one embodiment of the present disclosure.

Hereinafter, a configuration of a control device 200 according to one embodiment of the present disclosure will be described with reference to FIG. 6. The control device 200 includes a communication unit 210, an input unit 220, a sensing unit 230, an output unit 240, a storage unit 250, and a control module 290. In the description of FIG. 6, a description overlapping with that described in FIG. 1 will be omitted.

The input unit 220 may include at least one camera 221. The at least one camera may be fixed to camera fixing poles.

The control module 290 may recognize the EV entering the charging sector S1 based on information inputted through the input unit 220. The control module 290 may recognize the EV through the plurality of cameras 221a to 221c.

The control module 290 may select the charging robot 100a, which is disposed at a close distance from the charging sector S1 and is directly movable to the charging sector S1, and may cause the selected charging robot 100a to move to the charging sector S1.

The control module 290 may provide the position information on the charging port of the EV and the position information on the EV occupant, in real time, to the charging robot 100a entering the charging sector S1. The control module 290 may provide the charging robot 100a with information for facilitating the charging of the EV battery, and may monitor, in real time, whether the EV occupant USER safely enters the second space S1b.

The control module 290 may cause the charging robot 100a to move at the first speed when the EV occupant USER is located in the first space S1a, and may cause the charging robot 100a to move at the second speed when the EV occupant USER leaves the first space S1a and enters the second space S1b. The second speed may be faster than the first speed, but the first speed may be faster than the second speed when the charging robot 100a has already approached closely to the first space S1a at the first speed.

The control module 290 may cause the charging robot 100a to enter the first space S1a only when the EV occupant USER leaves the first space S1a.

In addition, when charging is completed, the control module 290 may confirm that the EV occupant USER is not located in the first space S1a and may cause the charging robot 100a to return the charging gun to the holder thereof.

Figure 7:
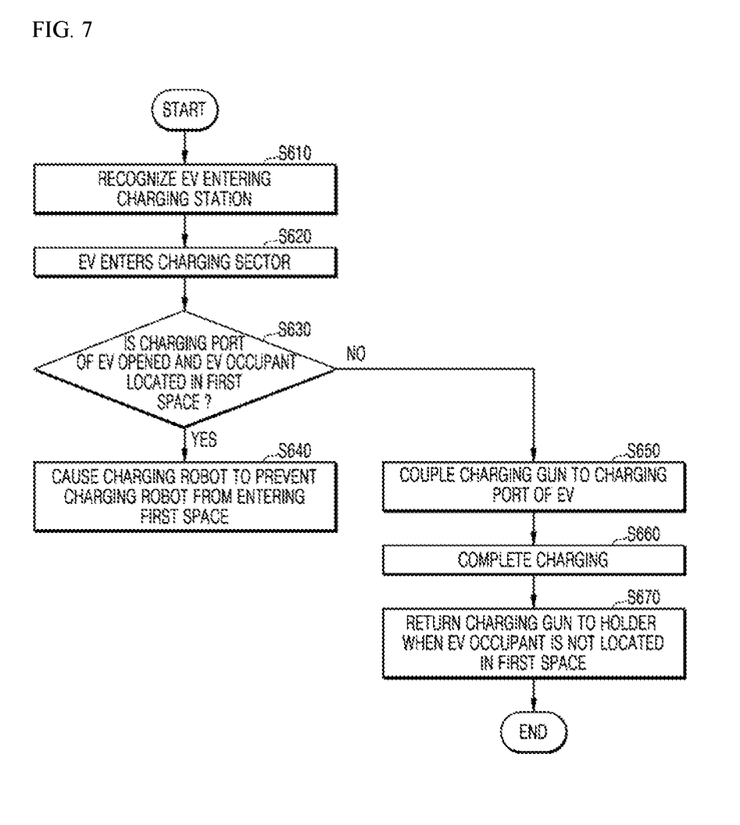
FIG. 7 is a sequence diagram illustrating a method of operating the device for controlling the charging robot according to one embodiment of the present disclosure.

FIG. 7 is a sequence diagram of a method of operating a control device 200 for controlling a charging robot for charging an EV battery according to one embodiment of the present disclosure.

First, the control device 200 recognizes the EV entering the charging station (S610).

Next, when the EV enters the charging sector (S620), it is determined whether the charging port of the EV is opened and the EV occupant is located in the first space (S630).

When the EV occupant is located in the first space S1a, the control device 200 causes the charging robot to prevent the charging robot from entering the first space (S640). Accordingly, safety of the EV occupant can be taken into consideration.

When the EV occupant is not located in the first space S1a (S630), the control device 200 causes the charging robot to grasp the charging gun and then couple the charging gun to the charging port of the EV (S650).

When charging is completed (S660), the control device 200 may cause the charging robot to return the charging gun to the holder thereof when the EV occupant is not located in the first space.

Meanwhile, the present disclosure described above may be embodied as computer-readable code on a computer-readable medium. The computer-readable medium includes any type of recording device capable of storing data which may be read by a computer system. Examples of the computer-readable medium may include a hard disk drive (HDD), a solid state disk (SSD), a silicon disk drive (SDD), a ROM, a RAM, a CD-ROM, a magnetic tape, a floppy disk, an optical data storage device, and the like. Further, the computer may include the control module 190 of the charging robot 100 or the control module 290 of the control device 200.

Although specific embodiments of the present disclosure have been shown and described above, the present disclosure is not limited to the specific embodiments described, and those skilled in the art will appreciate that various modification and changes may be made therein, without departing from the scope and spirit of the present disclosure. Therefore, the scope of the present disclosure should not be limited by the embodiments described but should be determined by the technical idea described in the claims.

What is claimed is:

1. A charging robot for charging an electric vehicle battery in a charging sector divided into a first space, in which a charging gun is located and in which the electric vehicle battery is charged, and a second space, adjacent to the first space, in which a charging manipulator is located, the charging robot comprising:
   a mover;
   a robot arm configured to handle the charging gun;
   one or more sensors;
   an inputter configured to input an image signal; and
   a controller configured to recognize a charging port of an electric vehicle based on information detected by the sensor or information inputted through the inputter, and cause the robot arm to couple the charging gun to the charging port,
   wherein the controller is configured to cause the mover to enter the first space when an electric vehicle occupant has moved from the first space to the second space.

2. The charging robot according to claim 1, wherein the controller is configured to:
   cause the mover to move at a first speed toward the first space while the electric vehicle is being parked in the first space; and
   cause the mover to approach the first space at a second speed faster than the first speed when the electric vehicle occupant has moved from the first space to the second space.

3. The charging robot according to claim 1, wherein the controller is configured to cause the robot arm to decouple the charging gun from the charging port, when charging of the electric vehicle battery is completed and the electric vehicle occupant is not located in the first space.

4. The charging robot according to claim 1, wherein the inputter includes a camera; and
   wherein the controller is configured to cause the mover to enter the first space when recognizing the electric vehicle occupant moving from the first space to the second space based on an image photographed through the camera.

5. The charging robot according to claim 1, further comprising a communicator; and
   wherein the controller is configured to cause the mover to enter the first space when a charging operation command is received through the communicator.

6. The charging robot according to claim 5, wherein the charging operation command is triggered by the charging manipulator located in the second space.

7. The charging robot according to claim 5, wherein the controller is configured to transmit a door lock command to the electric vehicle through the communicator so that when the mover enters the first space, doors of the electric vehicle are locked.

8. A charging robot for charging an electric vehicle battery in a charging station having a plurality of charging sectors, each of which is divided into a first space, in which a charging gun is located and in which the electric vehicle battery is charged, and a second space, adjacent to the first space, in which a charging manipulator is located, the charging robot comprising:
   a mover;
   a communicator configured to communicate with an external control device;
   a robot arm configured to handle the charging gun;
   one or more sensors;
   an inputter configured to input an image signal; and
   a controller,
   wherein the controller is configured to receive, from the control device through the communicator, position information on a charging port of an electric vehicle, position information on an electric vehicle occupant, and position information on a charging sector into which the electric vehicle enters, when the electric vehicle enters the charging station; and wherein the controller is configured to cause the mover to enter the first space of a particular charging sector when the electric vehicle occupant has moved from the first space to the second space of the particular charging sector.

9. The charging robot according to claim 8, wherein the controller is configured to:

cause the mover to move at a first speed toward the first space while the electric vehicle is being parked in the first space of the particular charging sector; and cause the mover to approach the first space of the particular charging sector at a second speed faster than the first speed when the electric vehicle occupant has moved from the first space to the second space of the particular charging sector.

10. The charging robot according to claim 8, wherein the controller is configured to cause the mover to enter the first space of the particular charging sector when a charging operation command is received through the communicator.

11. The charging robot according to claim 10, wherein the charging operation command is triggered by the charging manipulator located in the second space of the particular charging sector.

12. The charging robot according to claim 8, wherein the controller is configured to transmit a door lock command to the electric vehicle through the communicator so that when the mover enters the first space of the particular charging sector, doors of the electric vehicle located in the first space are locked.

13. A device for controlling one or more charging robots in a charging station having a plurality of charging sectors, each of which is divided into a first space, in which a charging gun is located and in which an electric vehicle battery is charged, and a second space, adjacent to the first space, in which a charging manipulator is located, the device comprising:

a communicator configured to communicate with the charging robot;

an inputter configured to input an image signal; and a controller, wherein the controller is configured to:

recognize an electric vehicle entering the charging sector based on information inputted through the inputter;

select a charging robot that is located at a close distance from the charging sector and is directly movable to the charging sector; and cause, through the communicator, the selected charging robot to move to the charging sector.

14. The device according to claim 13, wherein the controller is configured to provide, through the communicator, position information on the charging port of the electric vehicle and position information on the electric vehicle occupant, to the charging robot entering the charging sector, in real time.

15. The device according to claim 13, wherein the controller is configured to:

cause the selected charging robot to move toward the first space of the charging sector at a first speed when the electric vehicle is entering the first space of the charging sector; and cause the selected charging robot to approach the first space of the charging sector at a second speed faster than the first speed when the electric vehicle occupant has moved from the first space to the second space of the charging sector.

\* \* \* \* \*